(12) United States Patent
Chaney et al.

(10) Patent No.: US 6,619,020 B1
(45) Date of Patent: Sep. 16, 2003

(54) VALVE MECHANISM FOR A COMBINE HYDRAULIC SYSTEM

(75) Inventors: Mark Michael Chaney, Geneseo, IL (US); Scott Robert Bowers, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/177,329

(22) Filed: Jun. 21, 2002

(51) Int. Cl.⁷ .............................................. A01D 69/03
(52) U.S. Cl. ....................................................... 56/10.9
(58) Field of Search ................................ 56/10.8, 10.9, 56/14.7, 14.9, DIG. 11, DIG. 14, 15.6; 180/308; 701/71, 82, 83; 60/426

(56) References Cited

U.S. PATENT DOCUMENTS

| | | | |
|---|---|---|---|
| 4,046,399 A | 9/1977 | Zeuner et al. | 280/420 |
| 5,832,705 A | 11/1998 | Eis et al. | 56/14.9 |

FOREIGN PATENT DOCUMENTS

| | | |
|---|---|---|
| DE | 44 12 111 A1 | 10/1995 |
| DE | 44 12 114 A1 | 10/1995 |
| DE | 44 12 116 A1 | 10/1995 |
| DE | 195 36 345 C2 | 4/1997 |
| DE | 196 39 217 A1 | 4/1997 |
| EP | 0 676 123 A1 | 10/1995 |

OTHER PUBLICATIONS

Deere & Company, patent application Ser. No. 10/100,384 entitled Multifunction Latch for a Combine. filed Mar. 18, 2002.

Deere & Company, patent application entitled "Combine Hydraulic Reel Drive Shunt", filed Jun. 21, 2002.

*Primary Examiner*—Robert E. Pezzuto

(57) ABSTRACT

A hydraulic system for a combine and harvesting assembly having a valve mechanism that automatically routes fluid from a combine hydraulic line to a harvesting assembly hydraulic line when the harvesting assembly line is coupled with the combine hydraulic line, and automatically routes fluid from the combine hydraulic line to a hydraulic cylinder that controls the speed of a variable speed sheave of a conveyor drive system when the harvesting assembly hydraulic line is detached from the combine hydraulic line. The valve mechanism also includes a relief valve that allows pressurized fluid from the hydraulic cylinder to flow back to the combine's hydraulic system when the valve is routing fluid from the combine hydraulic line to the harvesting assembly.

5 Claims, 5 Drawing Sheets

VALVE MECHANISM FOR A COMBINE HYDRAULIC SYSTEM

FIELD OF THE INVENTION

This invention relates to agricultural combine harvester hydraulic systems and the mechanisms used to couple such a system to a harvesting assembly hydraulic system.

BACKGROUND OF THE INVENTION

Agricultural combine harvesters are provided with harvesting assemblies at the front of the vehicles. The harvesting assemblies engage the crop in the field being harvested and direct the crop into the combine vehicle for processing. Various different harvesting assemblies can be coupled to the front of the combine so that different crops can be harvested. For example, a harvesting assembly known as a corn head includes snapping rolls which snap corn stalks downwardly, pulling the ears of corn from the stalk as the stalk is pulled downwardly. The ears are then transported by an auger toward the centerline of the combine. A conveyor mechanism within a feederhouse then transports the ears of corn upwardly and rearwardly proximate the centerline of the vehicle so they can be further processed within the main body of the combine.

The combine vehicle includes a hydraulic system that adjusts the speed of the feederhouse conveyor, auger and snapping rolls. A variable diameter sheave driven by the combine's engine is provided for driving the conveyor. The diameter of the variable speed sheave is adjusted by a hydraulic cylinder that is fluidly coupled with the combine's hydraulic system by way of a hydraulic line. Fluid flowing into or out of the hydraulic line adjusts the position of the hydraulic cylinder, thereby adjusting the effective diameter of the sheave. The speed of a drive belt that extends between the variable speed sheave and the conveyor is thereby adjusted, resulting in the speed of the conveyor being correspondingly adjusted. The auger and snapping rolls are operatively connected with and driven by the conveyor such that adjustment of the speed of the conveyor also causes the speed of operation of the auger and snapping rolls to be adjusted. The operator adjusts the speed of the conveyor, auger and snapping rolls in this manner by manipulating hydraulic system controls within the cab of the combine.

Another type of harvesting assembly is known as a cutting platform, which is used to harvest crops such as wheat. The cutting platform includes a cutter bar that cuts the wheat near the ground surface and a conveyor that transports the cut crop to the combine for separation of the grains of wheat from the rest of the plant. These cutting platforms include a reel that rotates about a horizontal and laterally extending axis. The reel gently directs the crop rearwardly against the cutter bar. A conveyor within the feederhouse transports the crop rearwardly to the interior of the combine vehicle for further processing. The position of the reel can be raised and lowered by a pair of hydraulic cylinders located at the outer ends of the reel. In conventional combines these reel height adjustment cylinders are supplied fluid by the combine hydraulic system.

When the harvesting assembly is changed from a corn head to a cutting platform, a portion of the hydraulic line that extends to the variable speed sheave is hydraulically disconnected and instead is hydraulically connected to the cutting platform's hydraulic line that routes fluid to and from the reel height adjustment cylinders. With the cutting platform installed in this manner, the hydraulic cylinder that controls the position of the variable speed sheave is effectively cut off from the rest of the hydraulic circuit, thereby locking the hydraulic cylinder in a particular position. The variable speed sheave is thereby also locked in the corresponding position, which causes the conveyor, and the cutting platform cutter bar which is operatively connected to and driven by the conveyor, to operate at a corresponding fixed speed. When the variable speed sheave is hydraulically disconnected from the hydraulic system during installation of a cutting platform, the conveyor and cutter bar will often be set at a speed of operation that is undesirably fast for cutting platform operation. The operator needs to remember to lower the speed of the variable speed sheave prior to disconnecting it from the hydraulic system for changeover to the cutting platform. If he forgets to do this, the cutter bar of the cutting platform will typically operate at an undesirably fast rate, causing undesirable vibration during operation. To slow the cutterbar and eliminate the vibrations after the cutting platform is installed, the operator must hydraulically detach the hydraulic line from the cutting platform and reconnect it to the hydraulic cylinder that adjusts the position of the variable speed sheave, and then use the hydraulic controls in the cab to shift that cylinder and adjust the position of the variable speed sheave. The operator can then again detach the hydraulic line and re-attach it to the cutting platform hydraulic lines that extend to the reel height adjustment cylinders. The disadvantage of this operation is that it interrupts harvesting operations and consumes an undesirable amount of time.

It would be desirable to provide an agricultural combine that reduces or eliminates the vibrations caused by operation of a cutting platform's cutter bar at excessive speeds after changing the harvesting assembly from a corn head to a cutting platform. It would also be desirable to simplify the operation of changing the harvesting assembly from a corn head to a cutting platform, and to reduce the time required of the operator to make such a changeover.

SUMMARY OF THE INVENTION

The present invention provides a hydraulic system for a combine and harvesting assembly having a valve mechanism that automatically routes fluid from a combine hydraulic line to a harvesting assembly hydraulic line when the harvesting assembly line is coupled with the combine hydraulic line, and automatically routes fluid from the combine hydraulic line to a hydraulic cylinder that controls the position and speed of a variable speed sheave of a conveyor drive system when the harvesting assembly hydraulic line is detached from the combine hydraulic line. The valve mechanism also includes a relief valve that allows pressurized fluid from the hydraulic cylinder to flow back to the combine's hydraulic system when the valve is routing fluid from the combine hydraulic line to the harvesting assembly hydraulic line. A multicoupler is provided that allows a plurality of hydraulic and electrical lines of the combine to be coupled simultaneously with a plurality of corresponding hydraulic and electrical lines of the harvesting assembly. The valve mechanism can be defined in the body of the combine portion of the multicoupler. The valve mechanism includes a shunt or passageway defined within the body of the combine half of the multicoupler. The passageway automatically opens in response to the harvesting assembly's hydraulic line being detached from the combine hydraulic line. In this open configuration the shunt or passageway routes fluid from the combine hydraulic line to the hydraulic cylinder that adjusts the variable speed sheave. The passageway automatically closes in response to the harvesting assembly hydraulic line being attached to the combine hydraulic line.

DESCRIPTION OF THE PREFERRED EMBODIMENT

Figure 1:
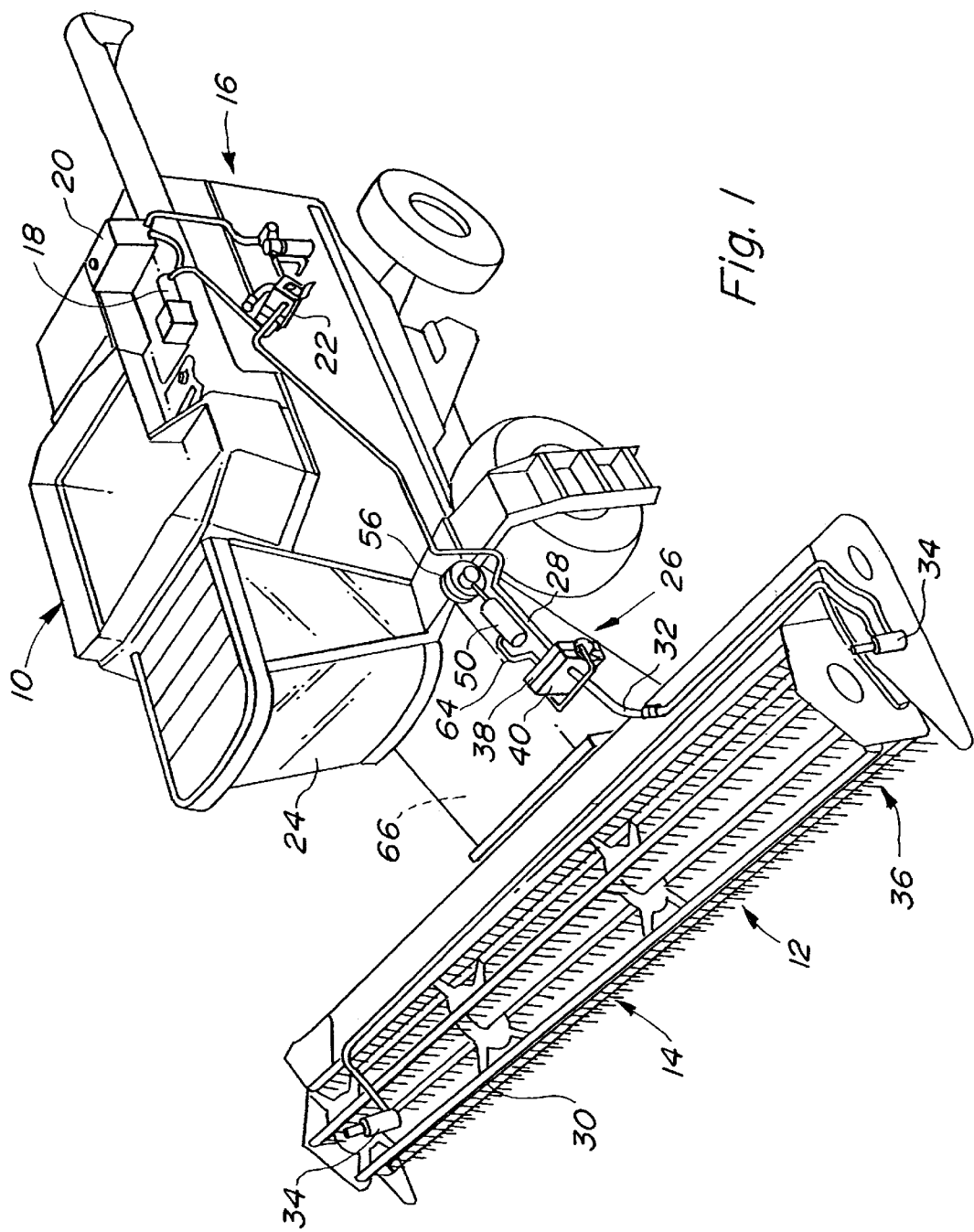
FIG. 1 is a partial perspective view of a combine vehicle having a cutting platform attached, showing representationally portions of the combine's hydraulic system, portions of the cutting platform's hydraulic lines, and a multicoupler that operatively connects the hydraulic lines of the combine with those of the cutting platform, and electrical lines from the combine with those on the cutting platform.

Referring now to FIG. 1, there is shown an agricultural combine vehicle 10 having a harvesting assembly 12 at the front of the combine 10. The harvesting assembly 12 illustrated is a cutting platform 14. The combine vehicle 10 includes a hydraulic system 16 having a pump 18, reservoir 20 and control valves 22. An operator within the cab 24 of the combine vehicle 10 engages controls within the cab 24 to manipulate the control valves 22. A multicoupler or gang coupler 26 is provided which serves to couple various hydraulic lines of the combine vehicle 10 with respective hydraulic lines carried by the cutting platform 14. Some of these hydraulic lines (not shown) are used to drive mechanisms of the harvesting assembly 12 such as the reel motor (not shown) which drives the cutting platform's reel 30. Other hydraulic lines that are coupled via the multicoupler 26 operate hydraulic cylinders 34 at each outer end of the reel 30 which adjust the height of the reel 30 with respect to the cutter bar 36. The multicoupler 26 includes a combine half 38 to which the ends of the hydraulic lines 28 from the combine 10 are fixed. A harvesting assembly half 40 of the multicoupler 26 is provided to which the ends of the hydraulic lines 32 of the harvesting assembly 12 are fixed. After a harvesting assembly such as the cutting platform 14 is attached to the combine vehicle 10 the two halves 38, 40 of the multicoupler 26 are brought together in conventional fashion to operatively couple and fluidly connect the various hydraulic lines of the harvesting assembly 12 and combine vehicle 10 for operation of the harvesting assembly 12. The ends of the hydraulic lines include quick coupling mechanisms 52 that allow the hydraulic lines to be fluidly coupled when joined together.

Figure 2:
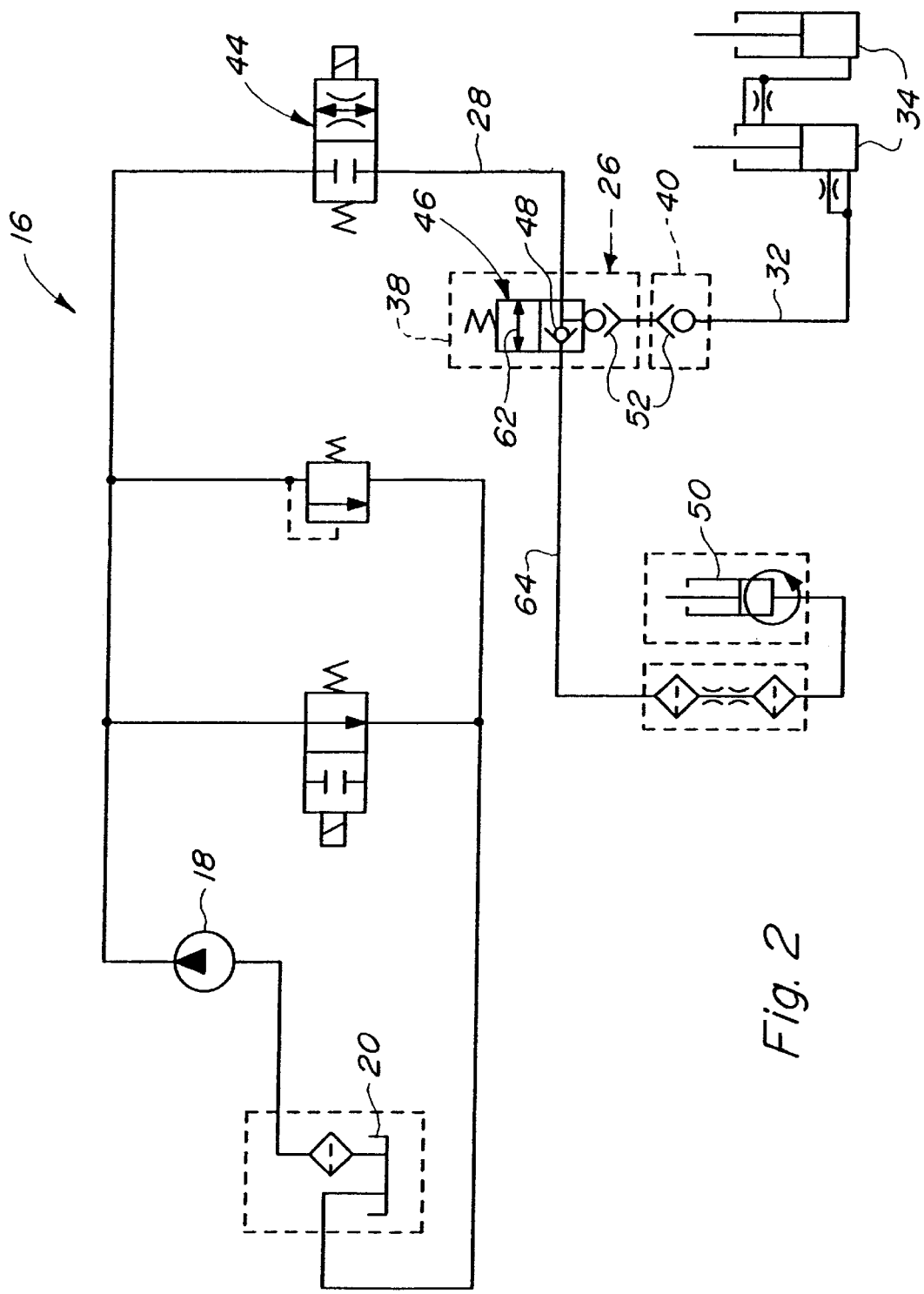
FIG. 2 is a schematic view of the combine's hydraulic system connected to a cutting platform via a multicoupler.

Referring now to FIG. 2, there is shown a schematic view of the hydraulic system 16 according to the present invention, with a cutting platform 14 attached to the combine vehicle 10. The pump 18 supplies fluid under pressure to a reel lift module 44. The reel lift module 44 controls the flow of fluid to and from the multicoupler 26. The combine portion 38 of the multicoupler 26 includes a valve mechanism 46 having two positions or orientations. The first position is shown schematically in FIG. 2, wherein the valve mechanism 46 fluidly connects the reel raise/lower cylinders 34 to the reel lift module 44 of the combine hydraulic system 16. As can be seen schematically in FIG. 2, quick coupler valves 52 are shown as open in response to a reel raise/lower hydraulic line 32 in the harvesting assembly half 40 of the multicoupler 26 being engaged with the hydraulic line 28 held by the combine half 38 of the multicoupler 26. In this configuration of the valve mechanism 46 the operator can engage hydraulic controls in the cab 24 to manipulate the reel lift module 44, which in turn controls the flow of fluid to and from the reel raise/lower cylinders 34, thus controlling the height of the reel 30 above the cutter bar 36. In this orientation of the valve mechanism 46 a relief valve 48 operates to allow high pressure fluid from the variable speed sheave's hydraulic cylinder 50 to escape to the combine's hydraulic system 16.

Figure 3:
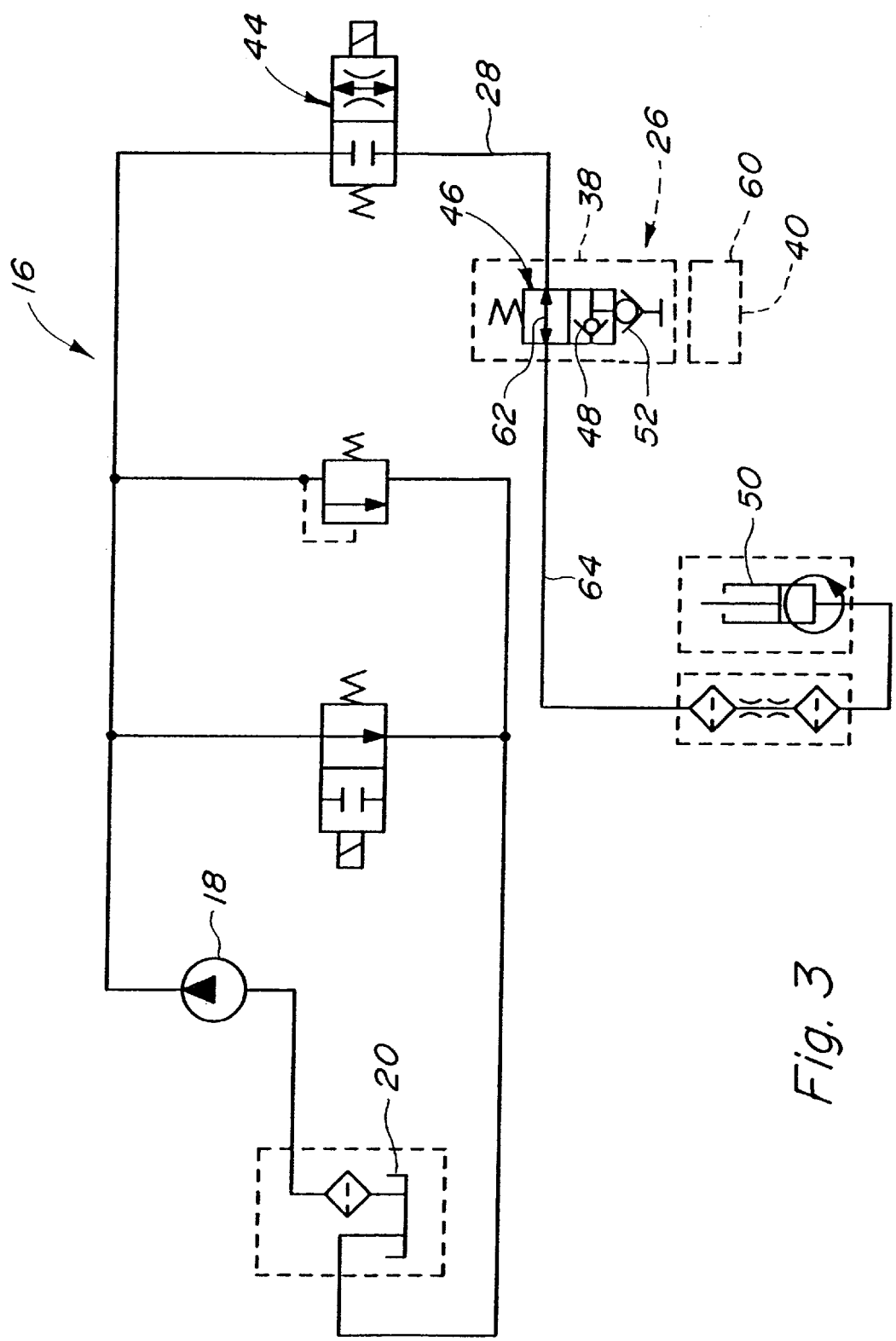
FIG. 3 is a schematic view of the combine's hydraulic system connected to a corn head via a multicoupler.

Referring now to FIG. 3, there is shown the hydraulic system 16 of the present invention with a corn head 54 attached to the front of combine vehicle 10 as the harvesting assembly 12. The valve mechanism 46 is shown schematically in its second orientation in response to no hydraulic line from the harvesting assembly 12 engaging the hydraulic line 28 held by the combine half 38 of the multicoupler 26. In this second orientation the valve mechanism 46 routes fluid from the hydraulic line 28 to the hydraulic cylinder 50 that adjusts the position of variable speed sheave assembly 56.

Figure 4:
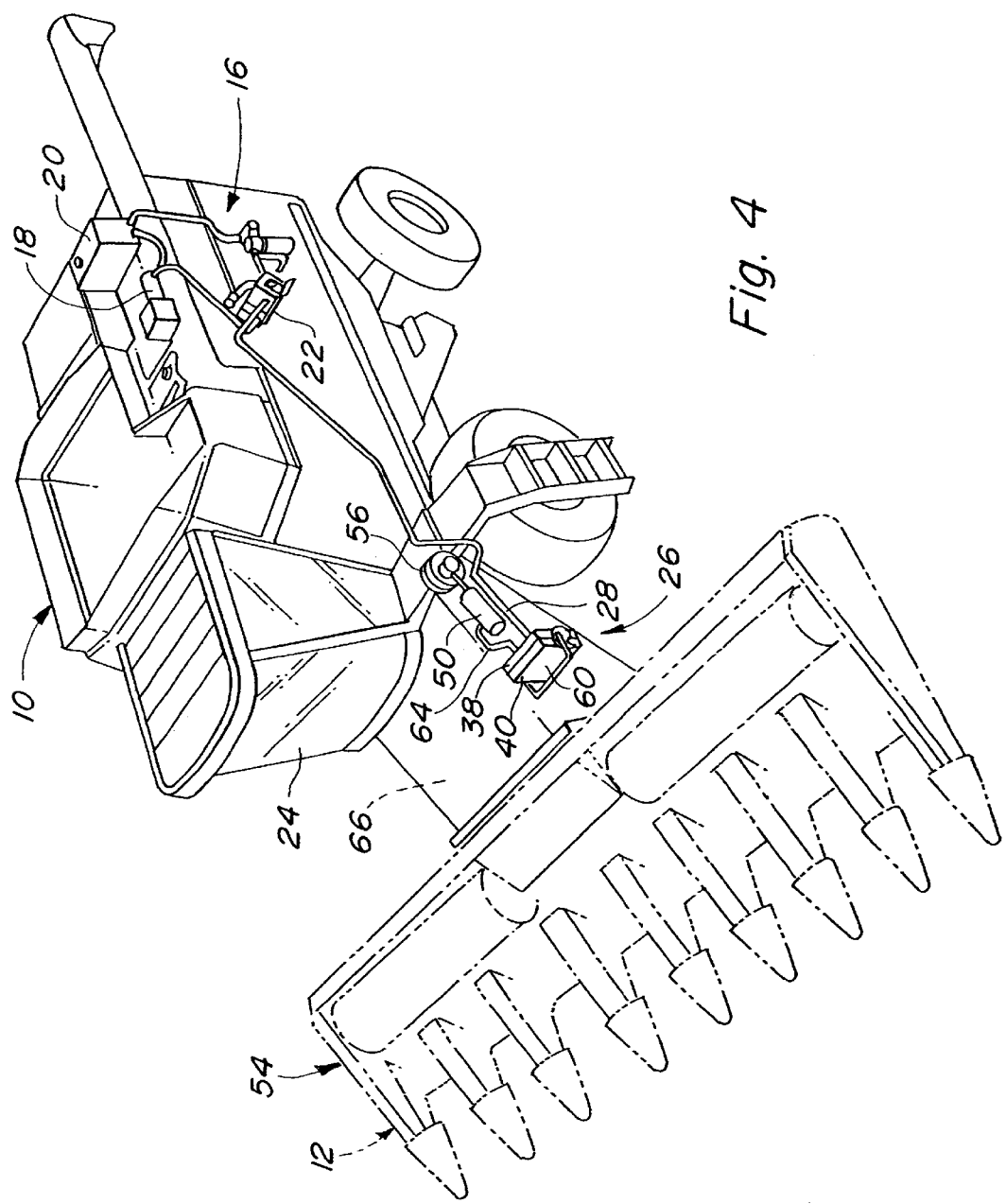
FIG. 4 is a partial perspective view of a combine vehicle of FIG. 1 having a corn head attached, showing a multicoupler that can fluidly connect hydraulic lines of the combine with those of the corn head, as well as electrical lines extending between the combine and corn head.

Referring now to FIG. 4, there is shown the combine 10 having a corn head 54 attached to the front of the vehicle 10. The harvesting assembly portion 40 of the multicoupler 26 is coupled with the combine half 38 of the multicoupler 26. The valve mechanism 46 within the body 58 of the combine half 38 of the multicoupler 26 is in the configuration shown in FIG. 3 since no hydraulic line from the corn head 54 is engaged with the hydraulic line 28 of the combine 10. The corn head portion 60 of the multicoupler does not include a hydraulic line that engages the hydraulic line 28 of the combine 10. In this configuration the operator can manipulate controls within the cab 24 which adjust the reel lift module 44. This in turn directs fluid toward or away from the hydraulic cylinder 50 that controls the position of the variable speed sheave 56. The speed of the variable sheave 56 is thereby controlled, causing the speed of the auger and snapping rolls to be correspondingly adjusted.

Figure 5:
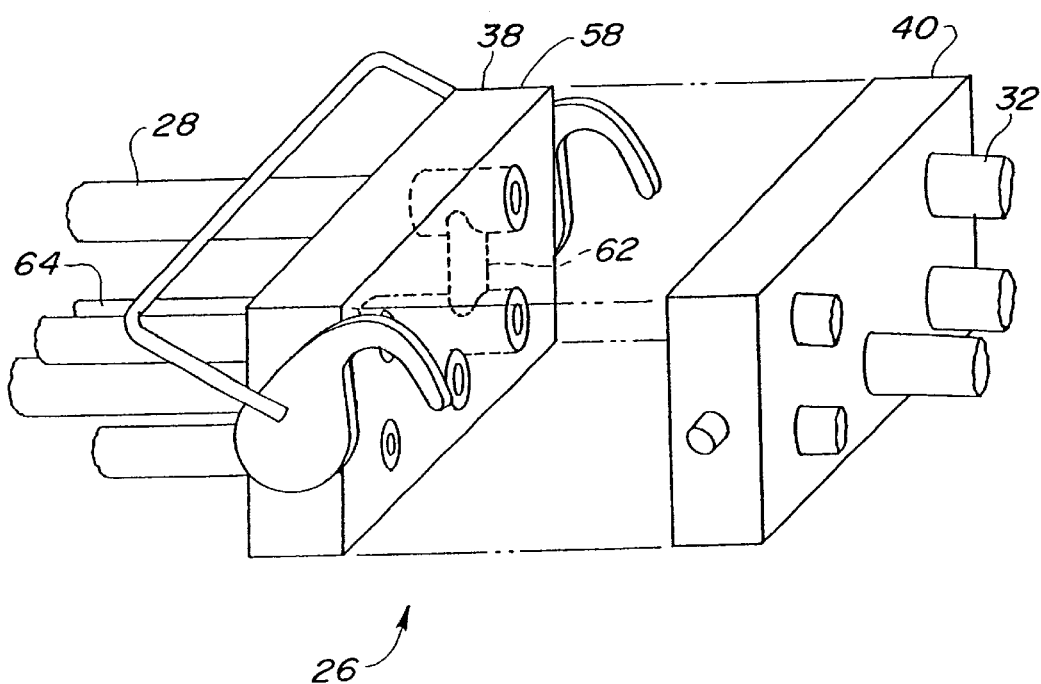
FIG. 5 is a representational view of two halves of a multicoupler, the combine portion of the multicoupler including a shunt or passageway capable of routing fluid between the combine hydraulic lines that are held by the combine portion of the multicoupler.

Referring now to FIG. 5, there is shown a schematic view of the combine portion 38 of the multicoupler 26 and a harvesting assembly portion 40 of the multicoupler 26 from a cutting platform 14. A shunt or passageway 62 is defined in the body 58 of the combine portion 38 of the multicoupler 26. The passageway 62 extends between the hydraulic line 28 and the hydraulic line 64 to the cylinder 50 that controls the variable speed sheave 56. An element (not shown) blocks off the shunt or passageway 62 when a hydraulic line 32 from the harvesting assembly 12 is engaged with the hydraulic line 28 extending from the combine 10. The element or seal will shift in response to removal of the cutting platform hydraulic line 32 from the combine hydraulic line 28, thereby opening the passageway 62 and allowing fluid to flow from the hydraulic line 28 to the line 64 that feeds the cylinder 50 of the variable speed sheave 56.

Next, the operation of the present invention according to the preferred embodiment will be discussed in greater detail. When operating the combine vehicle 10 with a corn head 54 attached, the hydraulic system 16 is as shown schematically in FIG. 3. The operator seated within the cab 24 can engage controls within the cab 24 which manipulate the reel lift module 44. As the reel lift module 44 is manipulated, fluid is allowed to either flow into or out of the hydraulic cylinder 50 which controls the sheave assembly 56. As fluid flows in or out of the cylinder 50, the sheave assembly 56 is adjusted, thus altering the effective diameter of the variable speed sheave assembly 56, resulting in adjustments of the speed of the feederhouse conveyor 66. The operator can continue to adjust the speed of the conveyor 66 as desired throughout operation of the combine 10 with the corn head 54 attached. The auger and snapping rolls are operatively driven by the conveyor 66 in conventional fashion, and therefore their speeds are correspondingly adjusted along with the conveyor's.

The corn head 54 can be removed and replaced with a different harvesting assembly 12 adapted for harvesting different crops. For example, the corn head 54 can be removed and a cutting platform 14 attached that is adapted for harvesting wheat. To do so, the operator disconnects the harvesting assembly portion 60 of the multicoupler 26 from the combine portion 38 of the multicoupler 26. The operator then disconnects the corn head 54 from the combine vehicle 10. The operator can then mount a cutting platform 14 to the combine vehicle 10, and can then couple the combine portion 38 of the multicoupler 26 to the harvesting assembly portion 40 of the multicoupler 26 associated with the cutting platform 14. When he connects the two halves 38, 40 of the multicoupler 26 the valve mechanism 46 automatically becomes configured as shown schematically in FIG. 2. The harvesting assembly portion 40 of the multicoupler 26 includes a quick coupler hydraulic port 42 that mates with the quick coupler 42 of the hydraulic line 28 extending from the reel lift module 44, which causes the valve mechanism 46 to shift to the position shown schematically in FIG. 2. In this position the reel lift module 44 controls fluid flow to and from the reel raise/lower cylinders 34, thereby adjusting the height of the reel 30. The hydraulic line 64 extending to the hydraulic cylinder 50 of the sheave assembly 56 will not receive fluid from the combine's hydraulic system 16. However, the relief valve mechanism 48 shown schematically in FIG. 2 will allow fluid to flow from the hydraulic cylinder 50 of the sheave assembly 56 back into the combine's hydraulic system 16 when there is a sufficient pressure differential, such as when the reel lift module 44 allows fluid to flow from the reel raise/lower cylinders 34 back into the combine hydraulic system 16. This allows the speed of the sheave assembly 56 to decrease to acceptable levels.

The present invention, by way of the relief mechanism 48, therefore operates to automatically allow the speed of the conveyor 66, and auger and cutting bars 36 driven thereby, to be reduced to a desirable speed when the cutting platform 14 is attached to the combine 10. The operator is not required to re-attach a hydraulic line to the hydraulic cylinder 50 of the sheave assembly 56 in order to adjust its speed. The valve mechanism 46 according to the present invention, which includes the relief mechanism 48, automatically lowers the speed and eliminates extra operations by the operator.

When the operator wishes to again harvest corn, he first detaches the two halves 38, 40 of the multicoupler 26 from one another. As the two halves 38, 40 of the multicoupler 26 are separated from each other, the cutting platform hydraulic line 32 is detached from the combine hydraulic line 28. This causes the valve mechanism 46 to shift to its second position shown in FIG. 3 wherein the passageway 62 is opened. The valve mechanism 46 then routes fluid between the reel lift module 44 and the hydraulic cylinder 50 that operates the variable speed sheave assembly 56. With the two halves of the multicoupler 26 detached, the operator can then remove the cutting platform 14 from the combine vehicle 10. The corn head 54 can then be mounted to the combine vehicle 10, and the corn head portion 60 of the multicoupler attached to the combine portion 38 of the multicoupler. The corn head portion 60 of the multicoupler 26 does not provide a hydraulic line that engages the combine hydraulic line 28 and, therefore, the valve mechanism 46 remains in the orientation shown in FIG. 3 during corn harvesting operations.

The multicoupler 26 can also be adapted as shown in U.S. patent application Ser. No. 10/100,384 entitled MULTI-FUNCTION LATCH FOR A COMBINE, which is hereby incorporated by reference, to automatically actuate a mechanical latching mechanism which physically couples the harvesting assembly 12 to the combine 10.

U.S. patent application entitled COMBINE HYDRAULIC REEL DRIVE SHUNT, which was filed on the same day by the same inventors as the present invention and which is hereby incorporated herein by reference, illustrates other aspects of a multicoupler which can be used with the multicoupler 26 according to the present application.

Having described the preferred embodiment, it will become apparent that various modifications can be made without departing from the scope of the invention as defined in the accompanying claims.

What is claimed is:

1. An agricultural combine vehicle, comprising:
   a conveyor driven by a variable speed sheave, and a hydraulic cylinder which adjusts the variable speed sheave,
   a hydraulic system, comprising:
      a pump that supplies pressurized fluid to a control module, which routes said fluid through a combine hydraulic line, and
      a valve mechanism having a first and second orientation, in said first orientation the valve mechanism routes fluid from the combine hydraulic line to a harvesting assembly hydraulic line when said harvesting assembly hydraulic line is hydraulically coupled with the combine hydraulic line and in said second orientation the valve mechanism automatically routes fluid from the combine hydraulic line to the hydraulic cylinder when harvesting assembly hydraulic lines are not hydraulically coupled with the combine hydraulic line.

2. The invention of claim 1, further comprising a relief valve which allows hydraulic fluid from the hydraulic cylinder to flow back to the combine hydraulic system when the valve mechanism is in the first position.

3. The invention of claim 1, wherein the valve mechanism is carried by a combine portion of a multicoupler.

4. The invention of claim 2, wherein the valve mechanism and relief valve are carried within the body of a combine portion of a multicoupler.

5. An agricultural combine vehicle, comprising:
   a conveyor driven by a variable speed sheave, and a hydraulic cylinder which adjusts the variable speed sheave,
   a hydraulic system, comprising:
      a pump that supplies pressurized fluid to a control module, which routes said fluid through a combine hydraulic line, and
      a valve mechanism having a first and second orientation, in said first orientation the valve mechanism routes fluid from the combine hydraulic line to the harvesting assembly hydraulic line when said harvesting assembly hydraulic line is hydraulically coupled with the combine hydraulic line and in said second orientation the valve mechanism automatically routes fluid from the combine hydraulic line to the hydraulic cylinder when harvesting assembly hydraulic lines are not hydraulically coupled with the combine hydraulic line, a relief valve which allows hydraulic fluid from the hydraulic cylinder to flow back to the combine hydraulic system when the valve mechanism is in the second position, said valve mechanism being carried by a combine portion of a multicoupler.

* * * * *